United States Patent
Le Quere

[11] Patent Number: 5,911,443
[45] Date of Patent: Jun. 15, 1999

[54] QUICK-COUPLING DEVICE FOR COUPLING A TUBE TO A RIGID ELEMENT

[75] Inventor: Philippe Le Quere, Rennes, France

[73] Assignee: Legris S.A., France

[21] Appl. No.: 08/860,725

[22] PCT Filed: Jan. 15, 1996

[86] PCT No.: PCT/FR96/00060

§ 371 Date: Jul. 16, 1997

§ 102(e) Date: Jul. 16, 1997

[87] PCT Pub. No.: WO96/22487

PCT Pub. Date: Jul. 25, 1996

[30] Foreign Application Priority Data

Jan. 19, 1995 [FR] France ................................. 95 00580
Jun. 20, 1995 [FR] France ................................. 95 07359

[51] Int. Cl.[6] .......................... F16L 55/16; F16L 37/133
[52] U.S. Cl. .............................. 285/3; 285/340; 285/379; 285/23
[58] Field of Search ............................... 285/3, 4, 23, 39, 285/340, 379, 380

[56] References Cited

U.S. PATENT DOCUMENTS

| 2,935,339 | 5/1960 | Frederick | 285/4 |
| 3,250,550 | 5/1966 | Lyon | 285/3 |
| 3,893,716 | 7/1975 | Moreiras et al. | 285/3 |
| 4,362,323 | 12/1982 | Lodder et al. | 285/4 |
| 4,647,012 | 3/1987 | Gartner | 285/23 |
| 5,429,394 | 7/1995 | Olson | 285/23 |
| 5,487,572 | 1/1996 | Combot-Courrau et al. | |
| 5,505,501 | 4/1996 | Seabra | 285/23 |

FOREIGN PATENT DOCUMENTS

| 645499 | 7/1962 | Canada | 285/4 |
| 2510227 | 1/1983 | France | 285/4 |
| 2 683 019 | 4/1993 | France . | |
| 40-5052286 | 3/1993 | Japan | 285/23 |
| 7312793-8 | 7/1978 | Switzerland | 285/23 |

*Primary Examiner*—Eric K. Nicholson
*Attorney, Agent, or Firm*—Sixbey, Friedman, Leedom & Ferguson, PC; Gerald J. Ferguson, Jr.

[57] ABSTRACT

A quick-coupling device in the form of an insertable cartridge for coupling a tube within a cylindrical housing, the device comprising a tubular insert having external means for anchoring it inside the housing and internal means for retaining the tube, together with a gasket; wherein the tubular insert has a nose of outside diameter that is smaller than the diameter of the means for anchoring the tubular insert and has a protection ring of inside diameter close to the outside diameter of the nose, said ring being mounted on the free end of the nose and being held axially relative to the nose by weak locking means in an axially projecting position relative to the nose for internally receiving the gasket.

9 Claims, 3 Drawing Sheets

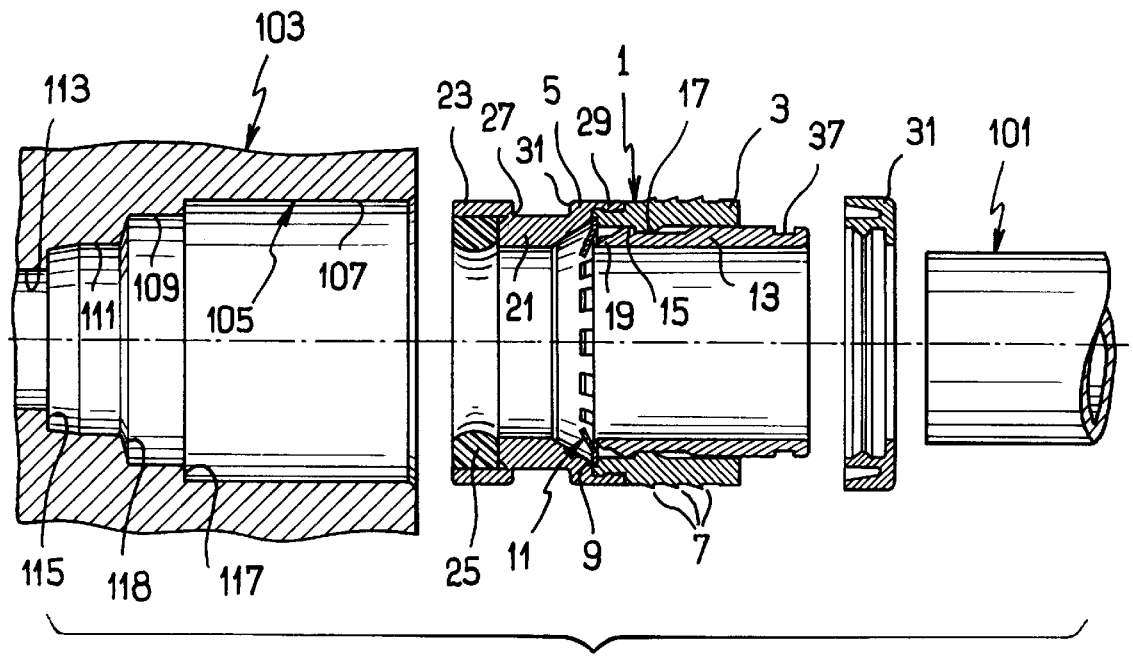
FIG_1
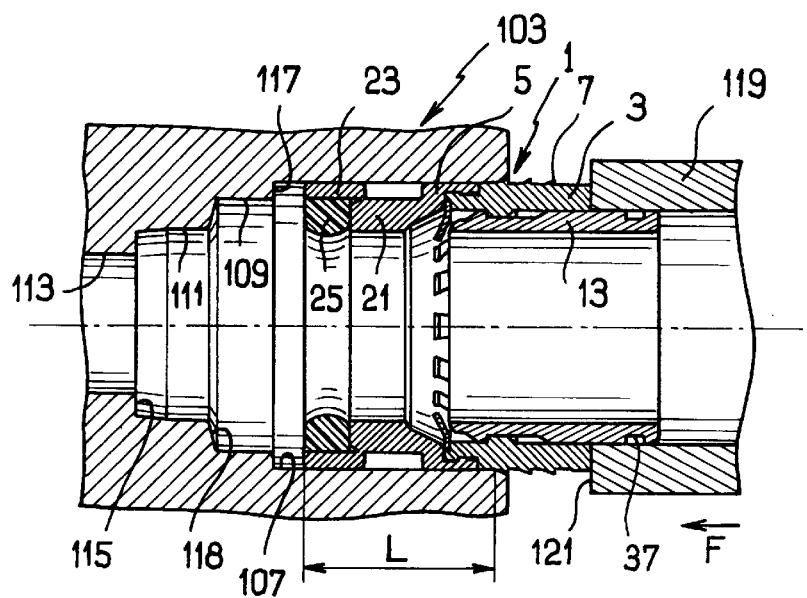
FIG_2

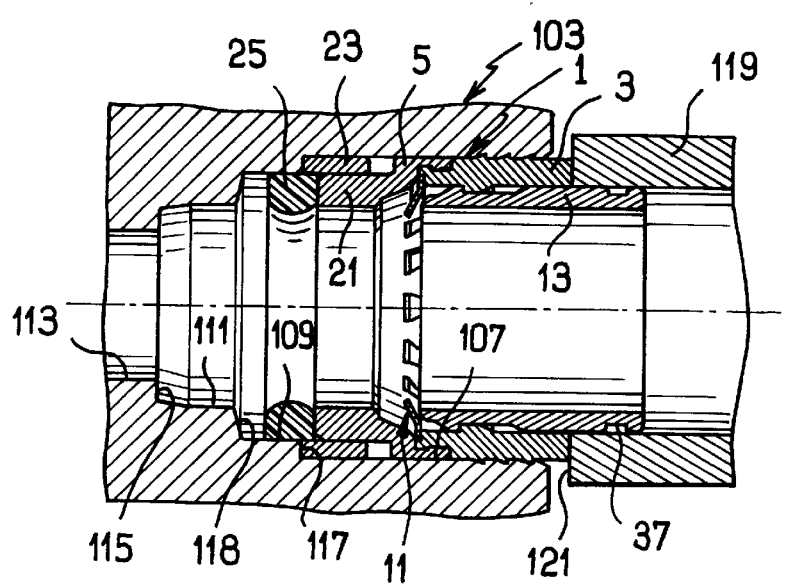
FIG_3
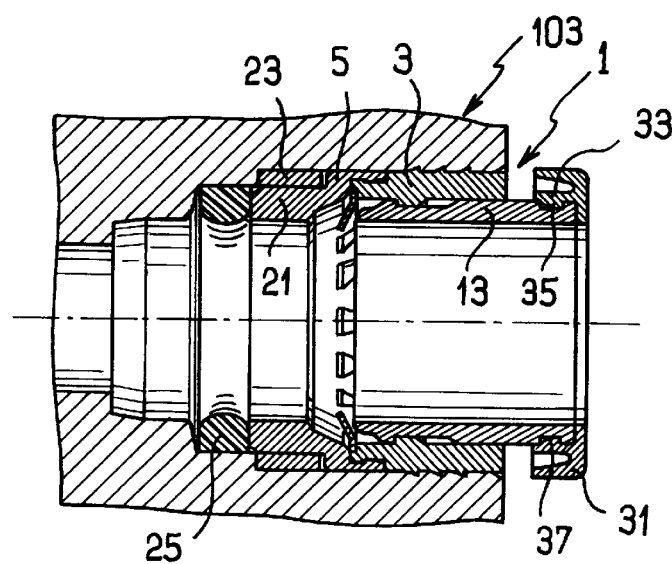
FIG_4
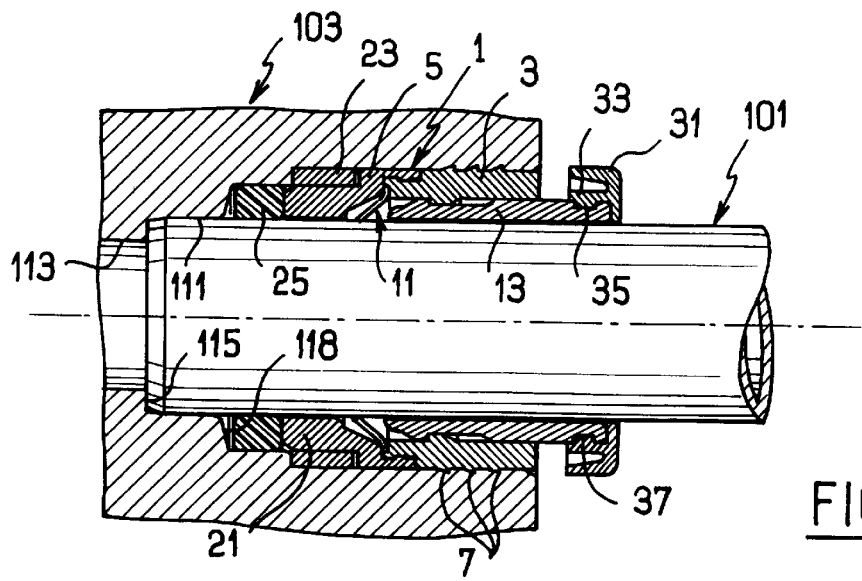
FIG_5

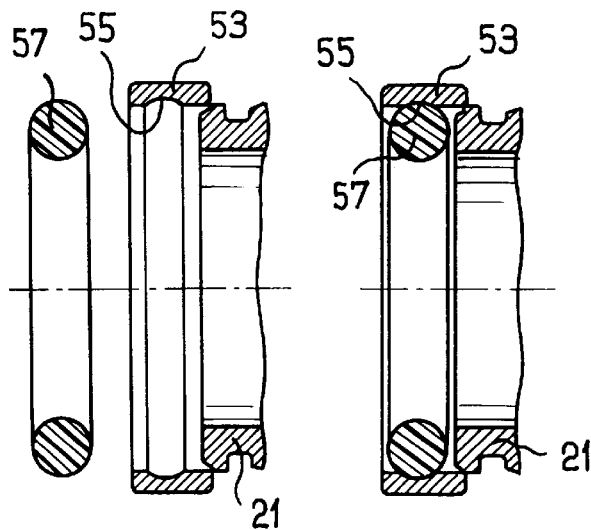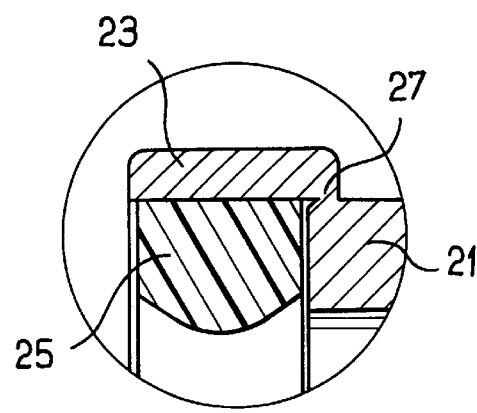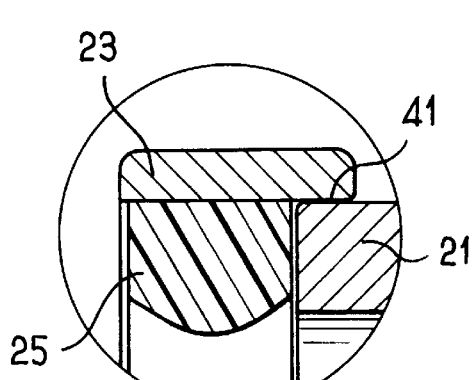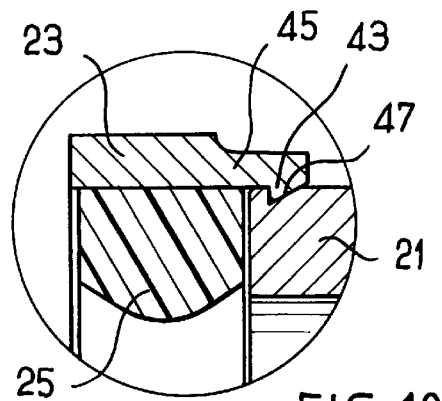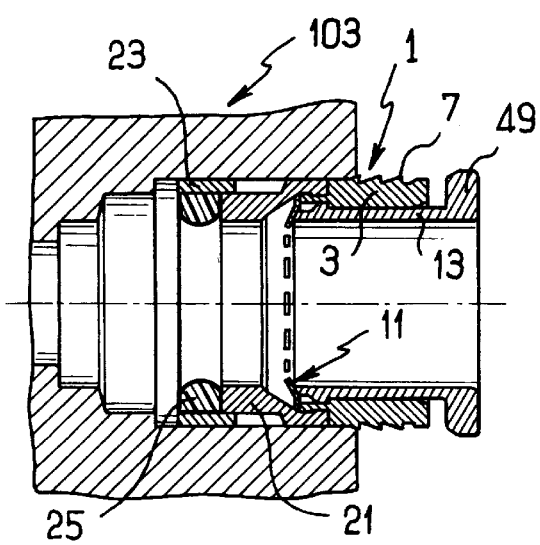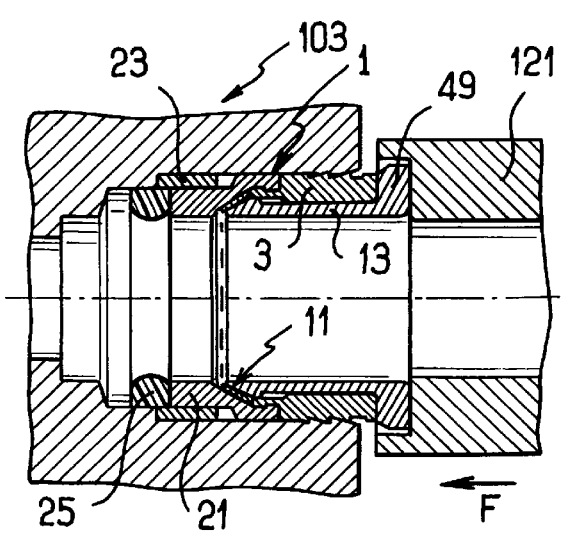

QUICK-COUPLING DEVICE FOR COUPLING A TUBE TO A RIGID ELEMENT

The present invention relates to a quick-coupling device for coupling a tube to a rigid element, and more particularly a "cartridge" type quick-coupling device for anchoring a tube in a bore of the rigid element (e.g. the body of a compressed air component) and for sealing the resulting coupling.

BACKGROUND OF THE INVENTION

Quick-coupling devices are known for sealably connecting a tube in a stepped bore of a rigid element. In general, that kind of device is in the form of a tubular insert comprising a tubular body having means for anchoring it permanently in the rigid element and means for retaining the tube. Usually, the anchoring means are implemented in the form of Christmas-tree shaped teeth formed on the outside face of the tubular body and opposing axial withdrawal of the body once the body has been inserted inside a first section of the bore in the rigid element. The tube-retaining means may be implemented in the form of a washer having inside teeth which are flexibly raised while the tube is being inserted and which tend to bite into the tube to oppose extraction thereof, or it may be in the form of a fastening ring comprising a plurality of longitudinal arms whose free ends have edges directed towards the outside surface of the tube and which co-operate via a camming surface with the tubular body so as to be clamped against the tube when it is pulled in the extraction direction. Between the tube and the body there may also exist a sliding pusher for raising the teeth so as to allow the tube to be disconnected. Prior to mounting in the rigid element, the coupling device is in the form of a "cartridge", i.e. the insert is pre-fitted internally with the tube-retaining means, and it is mounted in the rigid element merely by being forced into the stepped bore.

The coupling is sealed by means of a gasket, generally an O-ring, which is housed in a second section of the bore while the tubular body is being inserted inside the first section of the bore, the second section being of smaller diameter than the first. In general, the bore has a third section of even smaller diameter than the second section, and close to the outside diameter of the tube, which third section is intended to receive the end of the tube so as to position it properly.

At present, the above device is installed inside the bore by means of a special assembly tool in the form of a tubular sleeve which forces the tubular body to penetrate into the bore. A circularly symmetrical elongate part passes through the tubular body, and at one end it includes a shoulder which bears against an end of the tubular body while at its other end it has a groove in which the gasket is housed. On assembly, while the tubular body is being inserted inside the bore, the sealing ring is put into the second section of the bore and the elongate part is withdrawn.

Nevertheless, during storage and transport and during the various handling operations to which the couping device is subjected prior to assembly, the gasket is unprotected and may be damaged, or may even escape from the part on which it is held. Similarly, during assembly, since the outside diameter of the gasket is greater than the diameter of the second section of the bore, the ring rubs against the inlet edge of the second section and thus again runs the risk of being damaged.

It therefore seems appropriate to design a "cartridge" type quick-coupling device having means for protecting the gasket effectively both before and during assembly.

OBJECTS AND SUMMARY OF THE INVENTION

The invention provides a quick-coupling device in the form of an insertable cartridge for coupling a tube to the inside of a cylindrical housing, the device comprising a tubular insert having external means for anchoring it inside the housing and internal means for retaining the tube, together with a gasket, wherein the tubular insert has a nose of outside diameter that is smaller than the diameter of the means for anchoring the tubular insert and has a protection ring of inside diameter close to the outside diameter of the nose, said ring being mounted on the free end of the nose and being held axially relative to the nose by weak locking means in an axially projecting position relative to the nose for internally receiving the gasket.

Thus, prior to assembly, the gasket is secured to the cartridge and it is protected from possible external attack by the protection ring that surrounds it. During assembly, the tubular insert is inserted axially into the first section of the stepped bore. When the protection ring reaches the end of said first section, it comes into abutment against a shoulder formed by the second section of the stepped bore in the rigid element. The locking means which used to hold the protection ring relative to the nose then give way under the effect of the axial thrust force exerted on the tubular insert, such that the nose of the insert slides inside the protection ring and pushes the gasket into the second section of the bore in the rigid element. In this way, the gasket which is already compressed inside the protection ring so that its outside diameter is substantially close to the diameter of the second section of the bore, does not rub against the inlet edge of the second section and is therefore not subjected to any damage.

In an advantageous embodiment, the locking means for the protection ring are constituted by a connection zone between said protection ring and the nose, which zone has weak mechanical characteristics.

In a variant, the locking means for the protection ring consist in a zone of said ring connected to the nose by adhesive.

In another advantageous embodiment, the locking means of the protection ring comprise an internal projection formed on the protection ring and co-operating with an associated peripheral groove of the nose.

According to an advantageous characteristic of the invention, the protection ring has an outside diameter close to that of the means for anchoring the tubular insert. In this way, the outside surface of the protection ring provides guidance for the device inside the first section of the bore in the rigid element to improve centering of the device as a whole inside the bore, and in particular centering of the gasket relative to the second section of the bore.

According to another advantageous characteristic of the invention, the nose is of an axial length that is not less than the axial length of the protection ring. Thus, the nose pushes the gasket right out from the protection ring so that the gasket is completely housed inside the second section of the bore in the rigid element. It is then advantageous for the axial length of the nose to be limited to a value that is slightly greater than the axial length of the protection ring. Thus, there is no risk of the nose crushing the gasket between its own end face and the shoulder formed by the third section of the bore for receiving the end of the tube.

In another advantageous embodiment, in which the device includes a tubular pusher slidably mounted inside the tubular insert to control unlocking of the retaining means, the pusher possesses an end that projects from the end of the tubular insert remote from the nose and including a shoulder which, in an unlocking position of the pusher, bears against the end of the tubular insert.

In a variant embodiment of the protection ring, it has an inside groove forming a housing for the gasket.

BRIEF DESCRIPTION OF THE DRAWINGS

Other characteristics and advantages of the invention appear on reading the following description of a particular non-limiting embodiment described with reference to the accompanying figures, in which:

FIG. 1 is a section view on an axial plane through a quick-coupling device of the invention shown prior to being assembled inside a rigid element having an appropriately stepped bore;

FIGS. 2 and 3 are views similar to FIG. 1, showing how the device of the invention is assembled inside the bore of the rigid element;

FIG. 4 is a view analogous to FIGS. 2 and 3 after assembly;

FIG. 5 is a view analogous to FIG. 4, showing how a tube is coupled to the rigid element by means of the device of the invention;

FIGS. 6 and 7 are fragmentary section views on an axial plane, showing a variant embodiment of the protection ring;

FIG. 8 is a detailed view of the connection zone between the protection ring and the nose, showing a first embodiment of the locking means of the ring;

FIG. 9 is a view analogous to FIG. 8 showing a first variant embodiment of the locking means;

FIG. 10 is a view analogous to FIG. 8 showing a second variant of the locking means; and FIGS. 11 and 12 are views analogous to FIGS. 2 and 3, showing a variant embodiment of the quick-coupling device of the invention.

MORE DETAILED DESCRIPTION

With reference to the figures, and in particular FIG. 1, the quick-coupling device for coupling a tube 101 to a rigid element 103 is in the form of a cartridge insertable inside a cylindrical housing 105 in the element 103. It comprises a tubular insert 1 for housing in the housing 105 of the element 103. In this case the insert 1 comprises two portions: a tubular body 3 and a gasket support 5. The outside face of the portion 3 is fitted with sharp projections 7 in the form of Christmas-tree shaped teeth forming means for anchoring the insert 1 inside the housing 105. Between them, the two portions 3 and 5 define an inside groove 9 which constitutes a housing for a washer 11 that is provided with teeth for fastening and retaining the tube 101 which is to be inserted inside the tubular insert 1, as explained in greater detail below. The washer 11 is itself known, it is elastically deformable, and generally frustoconical, with its inside circumference being of a diameter smaller than the diameter of the tube 101.

A tubular pusher 13 is mounted to slide axially inside the portion 3 of the insert 1 between an inactive extended position where it is in abutment via a shoulder 15 against a shoulder 17 of the portion 3, with the washer then merely bearing against the end 19 of the pusher 13, and an active retracted position in which the shoulders 15 and 17 are spaced apart from each other and the end 19 raises the teeth of the washer 11. In addition, the inside diameter of the pusher 13 is close to the diameter of the tube 101. Such a disposition is well known in this type of coupling.

According to an essential characteristic of the invention, the portion 5 of the insert 1 includes a nose 21 of outside diameter smaller than the diameter of the anchoring means 7. A protection ring 23 of inside diameter close to the outside diameter oft the nose 21 is mounted at the free end of the nose 21 and it extends axially, projecting from the nose to receive a gasket 25 internally. In this case, the gasket has a cylindrical outside surface of diameter that is slightly greater than the inside diameter of the protection ring 23, and a toroidal inside surface of inside diameter that is slightly smaller than the outside diameter of the tube 101. In addition, in the example shown, the ring 23 has an outside diameter close to that of the anchor means 7 of the insert 1.

In FIGS. 6 and 7, there can be seen a variant embodiment of the protection ring. The ring, now referenced 53, has an inside groove 55 forming a housing for receiving the gasket 57 so as to hold it axially. This variant is particularly well adapted when the gasket is an O-ring, as in the example shown.

According to another essential characteristic of the invention, the protection ring 23 is secured axially on the nose 27 by weak locking means. In this case, as can be seen more clearly in FIG. 8, the nose 21 and the ring 23 are formed integrally with a connection zone 27 of weak mechanical characteristics. However it is also possible to make the locking means of the protection ring 23 in other ways. Two examples of variant locking means are shown in FIGS. 9 and 10.

In FIG. 9, which shows a first variant, the protection ring 23 is locked by means of a connection zone where the ring is held on the nose 21 by adhesive 41. In a second variant, as shown in FIG. 10, the protection ring 23 has an inside projection 43 in the form of a Christmas-tree shaped tooth formed on an end portion 45 of the radially resilient protection ring 23. The tooth 43 co-operates with an associated peripheral groove 47 formed on the nose 21. With this locking means, the protection ring 23 is in no danger of accidentally disengaging the nose 21 since the tooth 43 opposes any force tending to remove the ring 23. However, when the insert 1 is inserted into the bore 105 of the element 103 and the protection ring 23 comes into abutment against the transverse thrust face 117, the axial thrust force exerted on the insert 1 causes the tooth 43 to slide over the bottom of the groove 47 which forms a ramp causing the end portion 45 of the ring 23 to bend. The tooth 43 thus leaves the groove 47 and allows the protection ring 23 to slide overt the nose 21 as mentioned above.

In addition to the nose 21, the portion 5 includes a part 29 whose outside diameter is equal to that of the portion 3. This part 29 forms a shoulder having a transverse face 31 facing the protection ring 23 and constituting an abutment therefor.

Before assembly, the rigid element 103 must be given an appropriate bore to form the cylindrical housing 105 for receiving the insert. In this case, the housing is in the form of a bore subdivided axially into four sections. Going from right to left in the figure there is a large diameter section 107 for receiving the insert 1, a smaller diameter section 109 for receiving the gasket 25, a section 111 whose diameter corresponds substantially to the outside diameter of the tube 101 to be coupled, and a section 113 whose diameter is substantially equal to the inside diameter of the tube. Between the sections 111 and 113, a transverse thrust face 115 constitutes an abutment against insertion of the tube 101. In the example shown, the section 111 has a slightly conical end whose small base runs into the face 115, thereby establishing a small amount of compression at the leading end of the tube as it penetrates into the section 111 and comes into abutment against the face 115. Between the sections 105 and 109, a transverse thrust face 117 constitutes an abutment against the protection ring 23 being pushed into the section 107.

On assembly, the gasket 25 is initially greased. This difficult operation is made easier by the accessible disposition of the gasket 25 which is held inside the protection ring 23 prior to assembly. As shown in FIG. 2, the insert 1 is forced into the section 107 of the bore 105 by means of a sleeve-shaped tool 119 whose inside diameter is close to the outside diameter of the tubular pusher 13. To this end, the sleeve 119 covers that portion of the pusher 13 which projects from the portion 3 of the insert, and its front face 121 presses against said portion 3. An axial thrust force, symbolized by arrow F in FIG. 2, is exerted on the sleeve 119 so as to cause the insert 1 to penetrate into the section 107 of the bore 105.

In this context, it should be observed that the ring 23 which possesses a cylindrical outside face of diameter close to the inside diameter of the section 107 serves to improve the guidance and centering of the insert 1 inside the section 107. In particular, when the engagement force is applied to cause the teeth 7 to penetrate into the section 107, the considerable guidance length, referenced L in FIG. 2, serves to avoid the insert 1 jamming inside the section 107 by being out of alignment therewith.

When the protection ring 23 comes into abutment against the transverse thrust face 117, the axial thrust force exerted on the sleeve 119 exerts a shear force on the connection zone 27 between the ring 23 and the nose 21 sufficient to break said connection zone. The nose 21 then slides inside the protection ring 23 and pushes the gasket 25 into the section 109 of the bore 105, as symbolized in FIG. 3. In this context, it will be observed that the inside diameter of the protection ring 23 is substantially equal to or slightly less than the diameter of the section 109. In addition, the protection ring 23 is guided by its outside face inside the section 107 for optimum centering of the inside face of the ring relative to the section 109. The gasket 25 is thus subjected to no friction against the edge common to the transverse face 117 and the section 109 on being transferred from the protection ring 23 into said section 109, thereby protecting the gasket against any damage.

In the example shown, the axial length of the nose 21 is slightly greater than that of the protection ring 23. As a result, when the ring 23 comes into abutment against the transverse face 31 of the portion 5 of the insert 1, the gasket 25 is completely disengaged from the ring 23. Also, because the protection ring 23 comes into abutment against the face 31, thus limiting the length of the nose 21, the gasket 25 is not crushed between the face 118 and the end face of the nose 21. Thereafter the sleeve 119 is can be withdrawn.

As shown in FIG. 4, a drive ring 31 is mounted on the end of the tubular pusher 13 projecting from the portion 3 of the insert so as to facilitate subsequent drive of the pusher. In the example shown, the drive ring 31 has a radial section in the form of an open V-shape directed towards the portion 3 and it includes a substantially flexible inside branch 33 fitted on its inside face with a rim 35 for co-operating with a peripheral groove 37 formed in the end of the pusher 13. The drive ring 31 can thus be mounted by hand without using a tool after the sleeve 119 has been withdrawn.

When the tube 101 is inserted inside the insert 1, the teeth of the washer 11 are raised and they remain pressed resiliently in this manner against the outside face of the tube 101, while simultaneously the gasket 25 is compressed so as to provide a rigid and sealed coupling between the tube 101 and the element 103, as shown in FIG. 5.

FIGS. 11 and 12 show a variant embodiment of the quick-coupling device of the invention. The only change compared with the above-described embodiment concerns the pusher 13. The pusher is provided with an outside shoulder 49 formed on its end portion remote from the washer 11 and projecting radially outwards from the end of the insert 1 remote from its nose 21. On assembly, an appropriate tool 101 is therefore used that bears not on the insert 1 but on the shoulder 49 of the pusher 13, thereby exerting a thrust force F thereon. After the pusher 13 has slid a short distance inside the insert 1, causing the teeth of the washer 11 to be raised, the shoulder 49 comes into abutment against the corresponding end of the insert 1. The thrust force F exerted by the tool 121 is thus transmitted to the insert 1 without the washer 11 being crushed by the pusher 13.

It will be understood that it is more convenient to apply the assembly force directly against the pusher 13 rather than against the insert 1 insofar as the pusher 13 must in any case project beyond the insert 1 and must therefore be more directly accessible.

The invention is not limited to the embodiments described above, but on the contrary, it covers any variant using equivalent means to reproduce the essential characteristics specified above.

I claim:

1. A quick-coupling device in the form of an insertable cartridge for coupling a tube within a cylindrical housing, the device comprising a tubular insert having external means for anchoring it inside the housing and internal means for retaining the tube, the device further including a gasket, wherein the tubular insert has a nose of outside diameter that is smaller than the diameter of the means for anchoring the tubular insert and has a protection ring of inside diameter slightly greater than the outside diameter of the nose, said ring being mounted for sliding on the free end of the nose and being held axially relative to the nose by weak locking means in an axially projecting position relative to the nose for internally receiving the gasket.

2. A coupling device according to claim 1, wherein the locking means for the protection ring are constituted by a connection zone between said protection ring and the nose, which zone has weak mechanical characteristics.

3. A coupling device according to claim 1, wherein the locking means for the protection ring consist in a zone of said ring connected to the nose by adhesive.

4. A coupling device according to claim 1, wherein the locking means for the protection ring comprise an internal projection formed on the protection ring and co-operating with an associated peripheral groove of the nose.

5. A coupling device according to claim 1, wherein the protection ring has an outside diameter slightly less than that of the means for anchoring the tubular insert.

6. A coupling device according to claim 1, wherein the nose is of an axial length that is not less than the axial length of the protection ring.

7. A coupling device according to claim 6, wherein the axial length of the nose is limited to a value slightly greater than the axial length of the protection ring.

8. A coupling device according to claim 1, including a tubular pusher slidably mounted inside the tubular insert to control unlocking of the retaining means, wherein the pusher possesses an end that projects from the end of the tubular insert remote from the nose and including a shoulder which, in an unlocking position of the pusher, bears against the end of the tubular insert.

9. A coupling device according to claim 1, wherein the protection ring has an internal groove forming a housing for the gasket.

* * * * *